United States Patent [19]
Wood et al.

[11] Patent Number: 5,859,358
[45] Date of Patent: Jan. 12, 1999

[54] MEASURING STICTION AND FRICTION BETWEEN THE HEADS AND DISCS OF A HARD DISC DRIVE

[75] Inventors: Roy Lynn Wood, Yukon; Steven S. Eckerd, Oklahoma City, both of Okla.

[73] Assignee: Seagate Technology, Inc., Scotts Valley, Calif.

[21] Appl. No.: 847,652

[22] Filed: Apr. 30, 1997

[51] Int. Cl.$^6$ .................................................. G11B 15/46
[52] U.S. Cl. ........................................................... 73/9
[58] Field of Search .............................. 73/9, 10; 369/53, 369/58

[56] References Cited

U.S. PATENT DOCUMENTS 5,539,592  7/1996  Banks et al. ................................... 73/9

*Primary Examiner*—Robert Raevis
*Attorney, Agent, or Firm*—Crowe & Dunlevy

[57] ABSTRACT

Apparatus and method for measuring the maximum static friction force and the kinetic friction force between the heads of a disc drive and discs adjacent the heads. The disc drive is rotated by a computer controlled spin-up motor which provides constant angular acceleration of the disc drive. Voltages at the ends of the windings of a spindle motor of the disc drive are sampled to detect the angular acceleration at which disc rotation relative to the heads begins, from which the static friction force and the kinetic friction force are determined. The angular acceleration of the disc drive is monitored through the sampling of velocity commands used to control the angular acceleration of the disc drive, or through the use of an accelerometer mounted with respect to the disc drive.

14 Claims, 10 Drawing Sheets

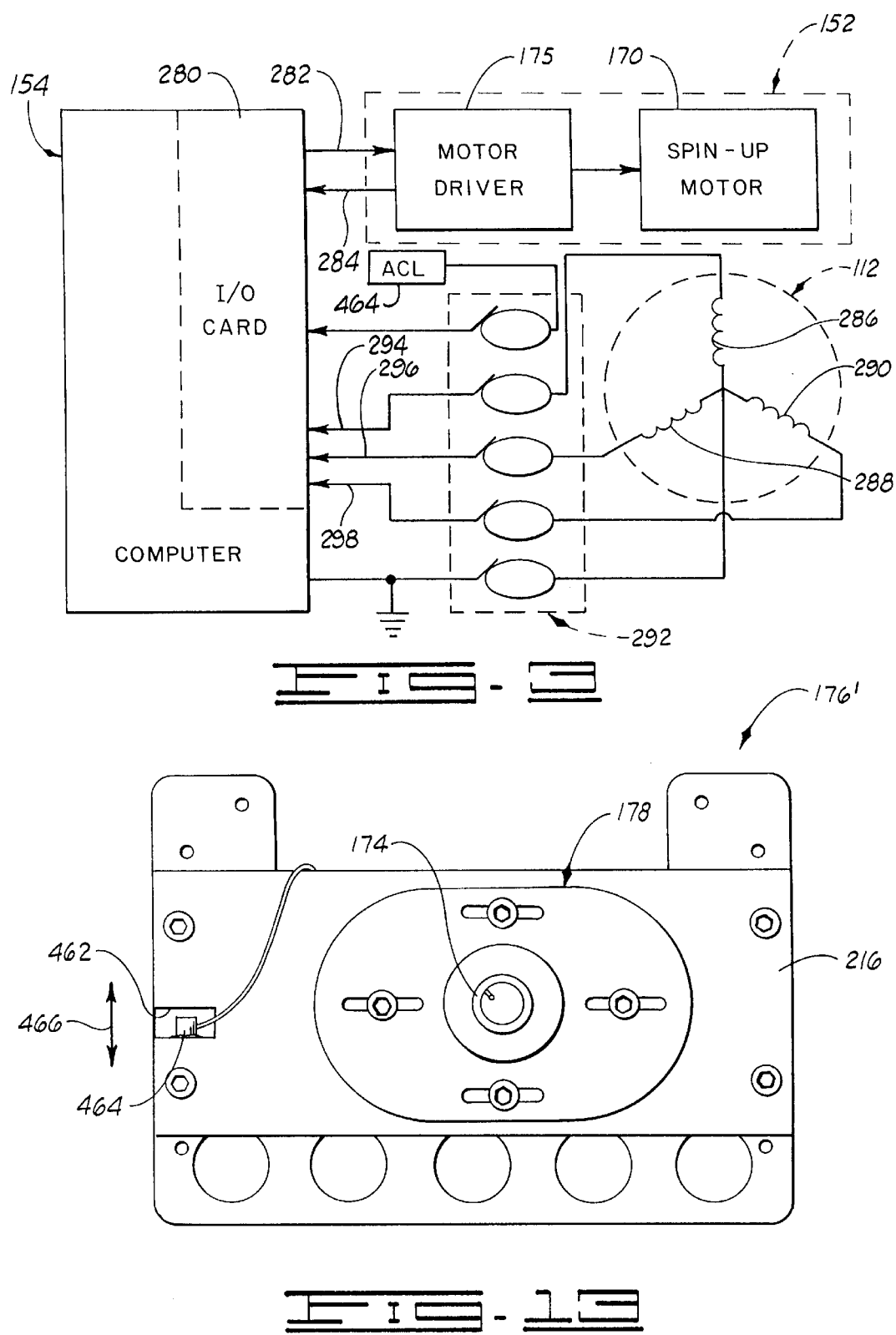

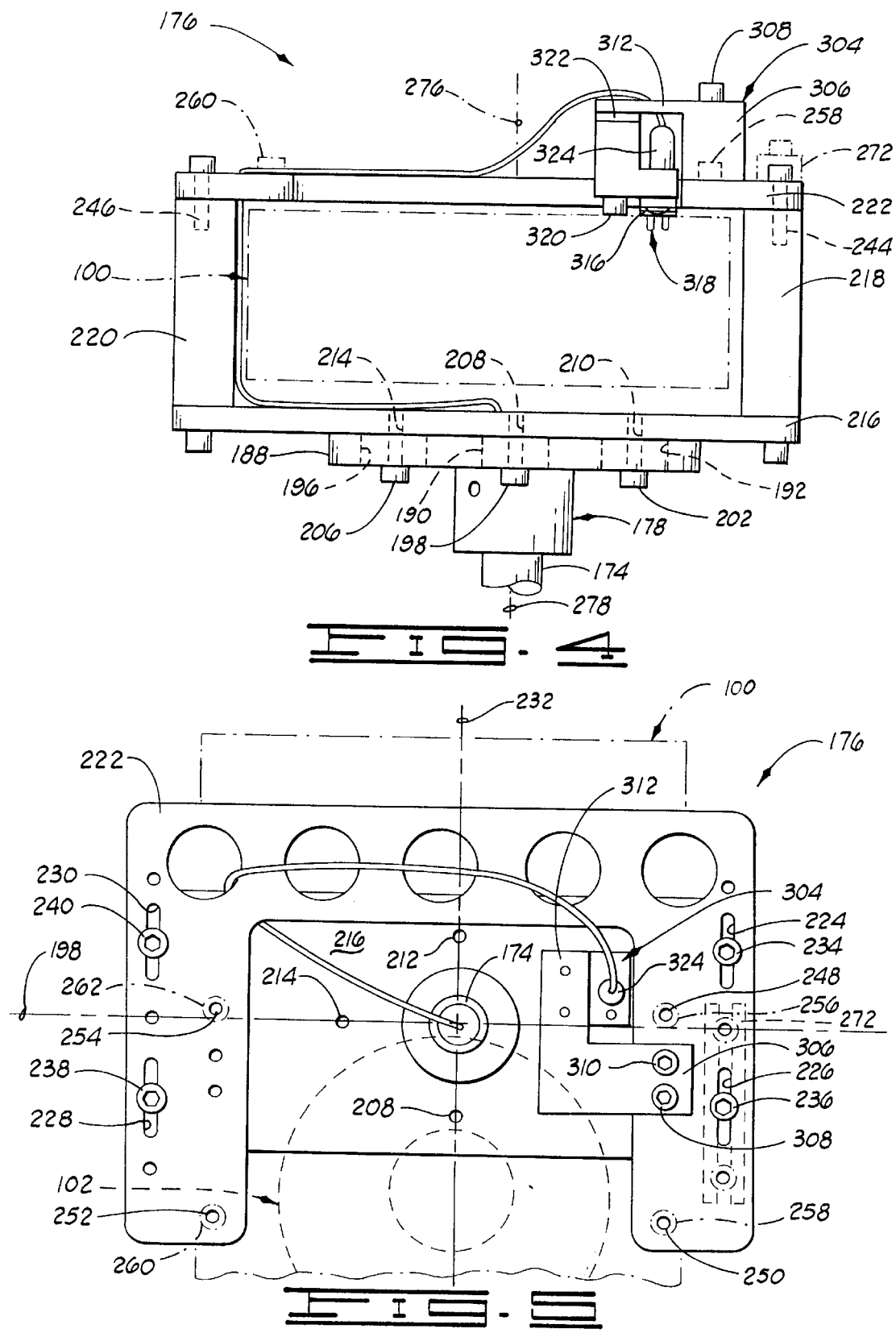

MEASURING STICTION AND FRICTION BETWEEN THE HEADS AND DISCS OF A HARD DISC DRIVE

FIELD OF THE INVENTION

The present invention relates generally to hard disc drives and more particularly, but not by way of limitation, to improvements in the measurement of static and kinetic frictional forces between the heads and discs of a disc drive.

BACKGROUND

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from an actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of a magnetic circuit comprising one or more permanent magnets and magnetically permeable pole pieces. When current is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the heads move across the disc surfaces.

The heads are typically provided with aerodynamically shaped slider assemblies which cause the heads to fly over the surfaces of the discs as a result of air currents established by the rotation of the discs. To limit wear and damage to the heads and the discs, contact between the heads and discs is generally minimized except at such time that the discs are not rotated at a speed sufficient to support the heads, during which time the heads are generally moved to and secured over landing zones of the discs, which are typically located near the innermost radii of the discs.

As part of quality control and ongoing research and development efforts, manufacturers of disc drives continually engage in test programs in which, among other things, the wear of the heads and of the discs in the landing zones is monitored as a function of the number of start ups of a disc drive. One manner of monitoring this wear is to measure the maximum static friction force, generally referred to as "stiction", that is exerted on the discs by the heads just prior to the onset of slippage of the discs along the heads and to measure the kinetic friction force, generally referred to as, simply, "friction", that exists after slippage occurs. These forces generally increase as the heads and disc surfaces are eroded so that the magnitudes of these forces provide an indication of the extent to which wear has occurred.

A problem with using stiction and friction as indicators of disc and head wear is that these effects have been difficult to measure accurately without the removal of a disc drive top cover, which is bolted to a corresponding disc drive base deck, or case. As will be recognized, the case and the top cover cooperate to provide an internally sealed environment for the disc drive necessary to minimize the introduction of contaminants which can adversely affect the performance of the drive.

While removal of the top cover has generally permitted accurate stiction and friction measurements, such methodology has also had a number of associated drawbacks. First, removal of the top cover requires a clean environment if the drive is to be reassembled and reoperated. Further, the disassembly and reassembly steps required to facilitate direct stiction and friction measurements with the top cover removed will invariably lead to damage of at least some of the drives subjected to such methodology. More significantly, however, disassembly and reassembly of a disc drive will typically lead to changes in the mechanical interrelationship between the heads and the discs sufficient to introduce inconsistency in subsequent measurements. This lack of consistency in stiction and friction measurements therefore inherently limits the uses that can be made of the measurements.

While problems that are occasioned by disassembly can be overcome by using the spindle motor upon which the discs are mounted to rotate the discs and measuring motor current and back emf (electromotive force) to determine stiction and friction, such measurements tend to have relatively large experimental errors. For example, such an approach will generally yield stiction measurements having tolerances of the order of +20%; friction measurements are even less precise.

Consequently, while stiction and friction measurements have provided disc drive manufacturers with a useful diagnostic tool, the value of this tool has been limited by practical difficulties that are inherent in making the measurements. Accordingly, there is a need for an improved approach to measuring stiction and friction in a disc drive that overcomes such limitations in the prior art.

SUMMARY OF THE INVENTION

The present invention provides an apparatus and method for accurately measuring stiction and friction between the heads and discs of a disc drive without the need for disassembly of the disc drive.

Generally, in accordance with the preferred embodiments of the present invention, the case of the disc drive is angularly accelerated about an axis that is parallel to the axis of the disc stack so that frictional forces between the heads and discs will cause an angular acceleration of the disc stack about its axis. During a measurement, the angular acceleration of the case is steadily increased while the voltages at the ends of the windings of the spindle motor upon which the discs are mounted are monitored to first detect and, subsequently, to measure emfs (voltages) that might be induced in the windings by relative motion of the rotor of the spindle motor with respect to the disc drive case.

At the point at which a voltage is first detected in the spindle motor windings (indicative of the onset of relative motion between the heads and discs), the frictional forces the heads are exerting on the discs will be at a maximum value. Accordingly, the stiction is determined by first multiplying the angular acceleration of the case when the voltage is detected by the moment of inertia of the disc stack about its symmetry axis. The resulting value is the torque exerted on the disc stack by the stiction. Next, the torque value is divided by the radius of the landing zone to determine a total stiction value. The total stiction value can then be divided by the number of heads to determine the stiction per head, which is the common quantity of interest.

Moreover, during subsequent acceleration of the case (during which continued slippage between the disc stack and the heads will occur), the voltages induced in the windings of the spindle motor are sampled and the samples are used to generate a table of disc stack orientations for a sequence of sample times. This table is then used to generate, successively, tables of the angular velocity and angular acceleration of the disc stack relative to the disc drive case.

Concurrently, the acceleration of the case is determined at the sample times so that the angular acceleration of the disc stack can be determined by subtracting the relative angular acceleration between the disc stack and case from the angular acceleration of the case. The total friction can then be determined by multiplying the angular acceleration of the disc stack by the moment of inertia of the stack about its symmetry axis and dividing by the radius of the landing zone. As in the case of stiction, the friction per head can then be determined by dividing by the number of heads in the disc drive.

The apparatus used in the preferred embodiment of the present invention to carry out these measurements generally comprises a disc drive mount that is secured to one end of the shaft of a spin-up motor to permit rotation of the case of a disc drive by mounting it in the disc drive mount and operating the spin-up motor. The disc drive mount is constructed to position the axis of the disc stack in a parallel relation to the axis of the spin-up motor shaft and connections to the ends of the disc drive spindle motor windings are made via a slip ring assembly that is mounted on the opposite end of the spin-up motor shaft.

Rotation of the spin-up motor is effected by a motor driver that is of the type that adjusts the current passed through the windings of the spin-up motor in relation to the difference between the angular velocity of the motor shaft, which the motor driver determines from current and back emf measurements, and a command velocity received by the motor driver.

A sequence of velocity commands, selected to cause a steady increase in spin-up motor acceleration, are sequentially transmitted to the motor driver from a computer system comprising a personal computer having an input/output card in an expansion slot and the computer system repetitively samples voltages at the ends of the disc drive spindle motor windings via the slip ring assembly to permit construction of a table of disc drive spindle motor emfs against sample index. From this table, the computer constructs a table of relative angular velocity of the disc stack relative to the disc drive case.

Concurrently with the sampling of voltages at the ends of the disc drive spindle motor windings, signals in the motor driver that express the angular velocity of the spin up motor shaft are sampled in one embodiment of the invention and the computer is programmed to construct a table of disc drive case angular accelerations from these samples. The computer is further programmed to determine the sample count at which a voltage is first induced in the windings of the disc drive spindle motor and, from the angular acceleration of the case for this sample count, determine the stiction in the manner described above.

In a further preferred embodiment of the present invention, the apparatus further comprises an accelerometer mounted on the disc drive mount to provide a direct measure of the angular acceleration of the disc drive case and this measure of angular acceleration of the case is sampled by the computer system via the slip ring assembly for generation of the table of case angular acceleration for use in determining stiction as described above.

These and various other features as well as advantages which characterize the present invention will be apparent from a reading of the following detailed description and a review of the associated drawings.

BRIEF DESCRIPTION OF THE DRAWINGS

FIG. 3 is a functional block diagram of the apparatus of FIG. 2, illustrating the electrical circuit of the apparatus.

FIG. 4 is a side elevational view of the disc drive mount of the apparatus shown in FIG. 2.

FIG. 5 is a top view of the disc drive mount.

FIG. 13 is a bottom view of the disc drive mount in accordance with a second preferred embodiment of the present invention.

DETAILED DESCRIPTION OF THE FIRST PREFERRED EMBODIMENT

Figure 1:
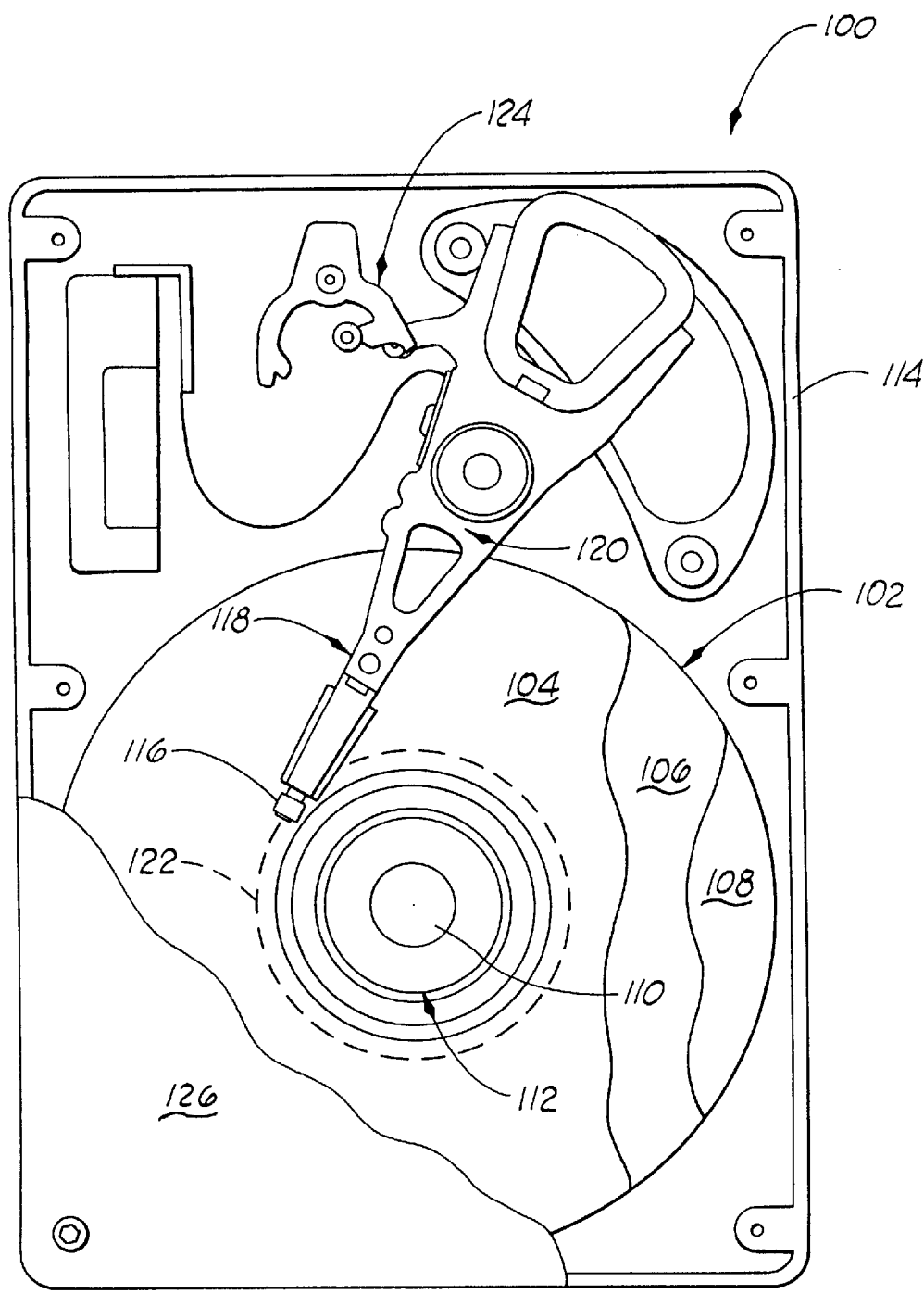
FIG. 1 is a top view in partial cutaway of a prior art disc drive for which stiction and friction measurements can be advantageously measured in accordance with the preferred embodiments of the present invention.

Referring now to the drawings, and particularly to FIG. 1, shown therein is a prior art hard disc drive 100 for which stiction and friction measurements can be advantageously measured in accordance with the preferred embodiments of the present invention.

The disc drive 100 generally comprises a disc stack 102 which, in turn, comprises a plurality of discs 104, 106 and 108 upon which computer files are magnetically stored. To this end, the discs are mounted on the rotor 110 of a spindle motor 112 for rotation in the case 114 of the disc drive about an axis that extends through the centers of the discs so that the files can be stored as patterns of magnetization of a surface medium along circular tracks that are defined on the discs. The magnetization of the discs is effected by read/write heads, such as the head 116 in FIG. 1, that are mounted on the ends of flexures 118 of an actuator 120 and the flexures extend into the disc stack to support the heads adjacent the disc surfaces and position them in radial alignment with a track to be written or, subsequently, to be read.

The flexures are constructed to bias the heads against the disc surfaces so that, when the discs are not rotating, the heads will be in contact with the disc surfaces; the heads are aerodynamically shaped so as to be supported over the disc surfaces by air currents generated by the rotation of the discs. As a result, the heads generally contact the disc surfaces only when the disc drive is not operating.

To minimize wear of the disc surfaces and the heads caused by frictional forces between the heads and surfaces when the heads move in contact with the discs, during non-operation the heads are typically located at landing zones, such as indicated at 122. More particularly, the heads 116 are moved by the actuator 120 to a position that will cause the heads to be radially aligned with the landing zones 122 during start up of the disc drive and at the end of operation. A latch assembly 124 is provided to secure the actuator in this position.

Figure 2:
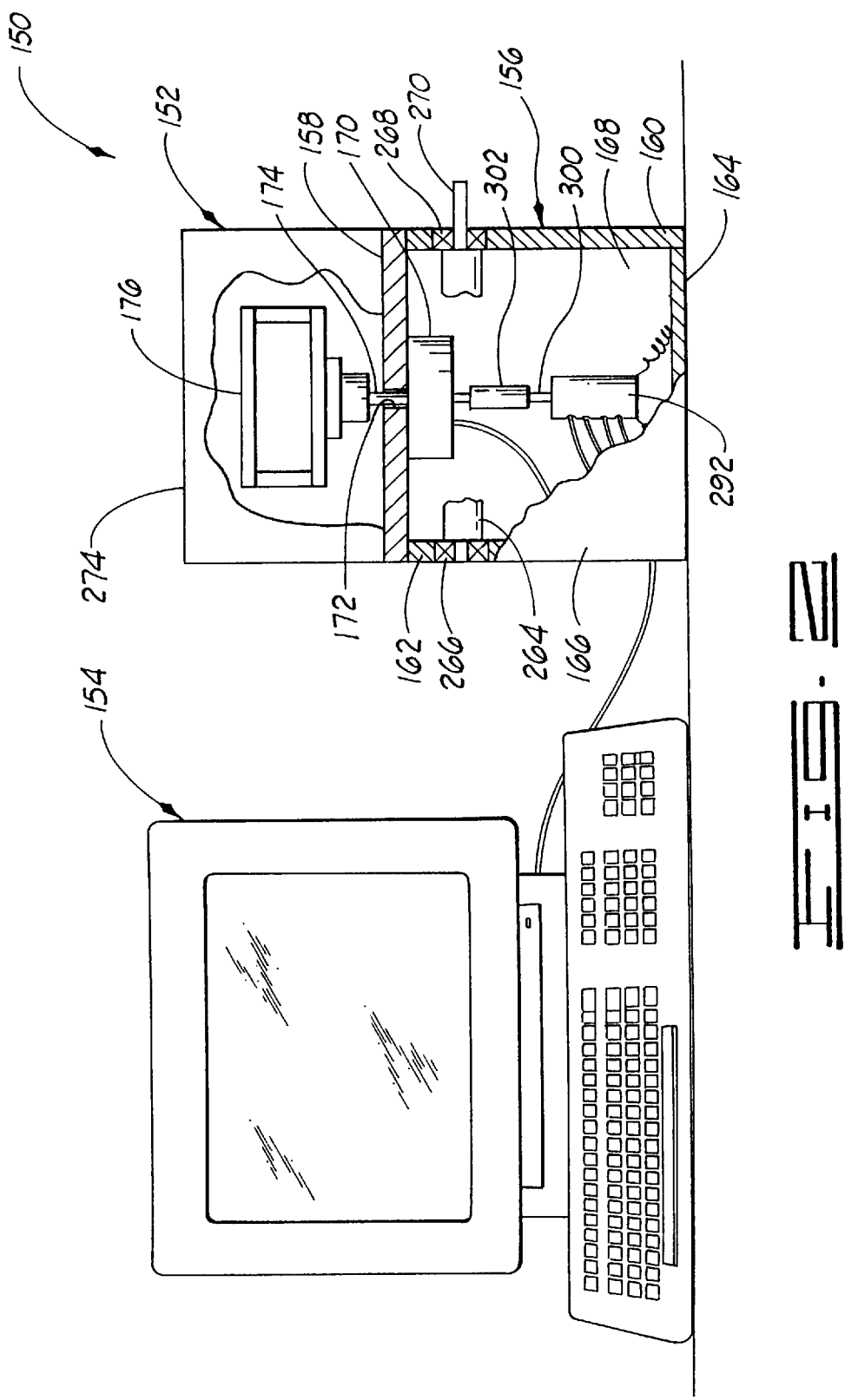
FIG. 2 is a front elevational view in partial cutaway and partial cross section of an apparatus constructed in accordance with the preferred embodiment of the present invention for measuring the stiction and friction between the heads and discs of a disc drive, such as the disc drive of FIG. 1.

Referring now to FIGS. 2 and 3, shown therein is an apparatus 150 constructed in accordance with the first preferred embodiment of the present invention for measuring the maximum static friction force, or "stiction", and the kinetic friction force, or "friction", between the discs and heads of a disc drive, such as the disc drive 100 of FIG. 1. As will be recognized, FIGS. 2 and 3 are complementary drawings, so that FIG. 2 generally illustrates the mechanical configuration of the apparatus 150 and FIG. 3 provides a functional block diagram for the electrical configuration of the apparatus 150. Accordingly, the apparatus has generally been designated with the same reference numeral 150 in both drawings and common reference numerals will be used for components of the apparatus 150 that are common to both figures without regard to the form in which a component is illustrated in these drawings.

As shown in FIG. 2, the apparatus 150 generally comprises a disc drive spin assembly 152 which spins the disc drive 100 (not shown in FIG. 2) at an increasing rate during the measurement of stiction and friction and a computer 154, which controls the operation of the spin assembly 152 and determines the stiction and friction from signals generated by the spin assembly 152 during spin up of the disc drive. Referring specifically to FIG. 2, the disc drive spin assembly 152 preferably comprises a cabinet 156 constructed of plate aluminum and includes a support plate 158 which forms the top of the cabinet 156, side walls 160 and 162, a floor 164 and front and rear walls, 166 and 168 respectively. Thus, the interior of the cabinet 156 is entirely enclosed and shielded by the electrically conductive aluminum plate. As will be noted below, such construction permits the suppression of electrical noise during stiction and friction measurements.

A spin-up motor 170 is mounted on the support plate 158 and a hole 172 is formed through the support plate for passage of the shaft 174 of the motor 170. The spin-up motor 170 is a conventional direct current (dc) motor so that the construction thereof need not be further considered for purposes of the present disclosure other than to note that the shaft 174 is constructed in the form of a tube (see FIGS. 5 and 7) that extends from both the upper and lower ends of the case (not numerically designated in the drawings) of the spin-up motor 170 for purposes to be discussed below. During operation of the apparatus 150, electrical currents are passed through the spin-up motor 170 by a motor driver 175 (FIG. 3) that is constructed in a conventional manner to sense the rotational velocity of the motor 170 and to adjust the current passed through the windings of the motor 170. The current will be proportional to the difference between motor rotational velocity and a velocity command that is received by the motor driver 175. In the preferred embodiment, the velocity command is received from the computer 154 as will be discussed below.

Figure 6:
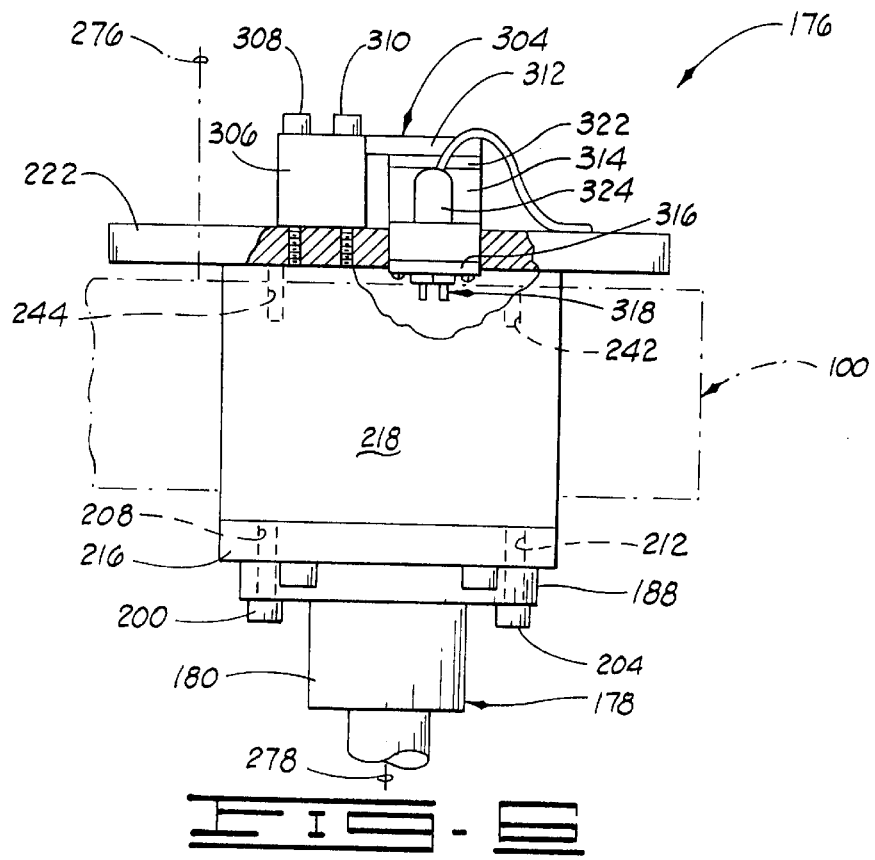
FIG. 6 is an end elevational view of the disc drive mount in partial cutaway and partial cross section.
Figure 7:
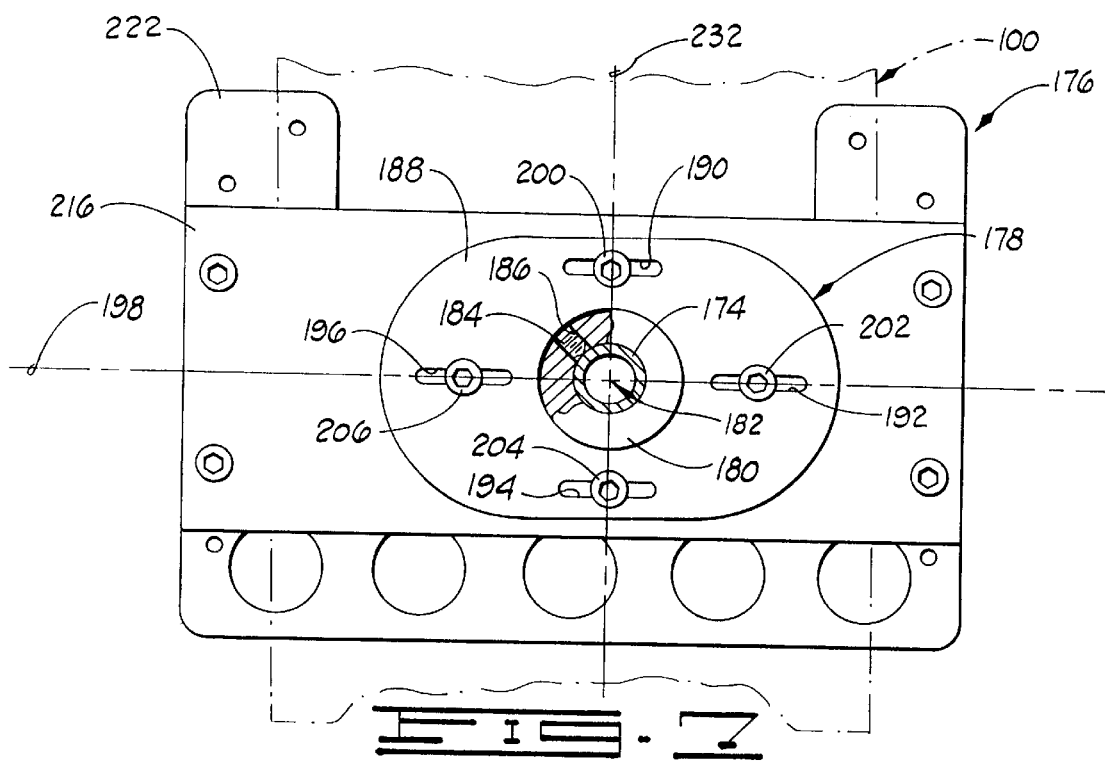
FIG. 7 is a bottom view of the disc drive mount in partial cross section.

Continuing with FIG. 2 and with reference to FIGS. 4 through 7, the disc drive spin assembly 152 further comprises a disc drive mount 176 that, during measurement of stiction and friction of a disc drive, is secured to the upper end of the spin-up motor shaft 174. More particularly, as shown in FIG. 7, the disc drive mount 176 comprises a coupler 178 which has a body portion 180 through which a bore 182 is axially formed on a diameter to fit the spin-up motor shaft 174. The disc drive mount 176 is secured to the shaft 174 via a set screw 184 in a threaded hole 186 formed transversely through the wall of the body portion 180. The purpose underlying this manner of securing the disc drive mount 176 to the shaft 174 will become apparent below.

At its upper end, the coupler 178 is provided with a flange 188 through which, as also shown in FIG. 7, four slots 190, 192, 194 and 196 are formed to extend in a direction parallel to a longitudinal axis 198 of the coupler 178 which defines a longitudinal axis for the disc drive mount 176. Screws 200, 202, 204 and 206 are passed through the slots 190, 192, 194 and 196 respectively into threaded holes 208, 210, 212 and 214 respectively of a base plate 216. As will be clear from such connection of the coupler 178 to the base plate 216, major portions of the disc drive mount 176 can be positioned longitudinally on the coupling 178. The purpose and significance of this positioning capability will be discussed below.

As more particularly shown in FIGS. 4 and 6, the disc drive mount 176 further comprises end plates 218 and 220 that are bolted to opposite ends of the base plate 216 to extend upwardly therefrom in a parallel relation and a U-shaped disc drive mounting plate 222 that is bolted to the tops of the end plates 218 and 220. As shown in FIG. 5, slots 224, 226, 228 and 230 extend parallel to an axis 232 that is transverse to the longitudinal axis 198 and are formed through the disc drive mounting plate 222 for attachment of the disc drive mounting plate 222 to the upper ends of the end plates 218 and 220. In particular, the disc drive mounting plate 222 is attached to the end plates 218 and 220 via screws 234, 236, 238 and 240 that pass through the slots 224, 226, 228 and 230 respectively and into threaded holes, 242, 244 and 246, for the screws 234, 236 and 238 respectively, formed in the upper ends of the end plates 218 and 220 and a threaded hole (not shown) formed in the upper end of the end plate 220 for the screw 240. The slots 224, 226, 228 and 230 provide the disc drive mounting plate 222 with a transverse positioning capability that complements the longitudinal positioning capability provided by the slots 190, 192, 194 and 196 of the coupler flange 188. Thus, the disc drive mounting plate can be positioned in any direction atop the spin-up motor shaft 174 for a purpose that will be discussed below.

During the measurement of the stiction and friction between the heads and discs of the disc drive 100, the disc drive is mounted in the disc drive mount 176 to extend through the space between the end walls 218, 220 and between the base and mounting plates 216 and 222 respectively as shown in phantom line in FIGS. 4 through 7. Such mounting of the disc drive can be conveniently effected via threaded holes (not shown) formed in the bottom of the case of a disc drive for mounting of the disc drive in a computer housing. Thus, as shown in FIG. 5, holes 248, 250, 252 and 254 are formed through the disc drive mounting plate 220 so that the disc dive can be attached to the underside of the plate 220 by way of screws 256, 258, 260 and 262. As also indicated in FIG. 5, such mounting of the disc drive 100 will generally not result in the disc stack 102 being coaxial with the spin-up motor shaft 174. This point will be further discussed below.

Referring again to FIG. 2, the disc drive spin assembly 152 further comprises a balance shaft 264 that is mounted on the sidewalls 160, 162 of the cabinet 156 by way of bearings 266 and 268 for free rotation of the shaft 264 about a horizontal axis. A stub axle 270 is formed on one end of the balance shaft 264 on a diameter that is substantially equal to the diameter of the spin-up motor shaft 174 to permit balancing of the disc drive mount 176 and a disc drive mounted thereon about the spin-up motor shaft 174 prior to measuring the stiction and friction between the heads and discs of the disc drive. In particular, such balancing is effected by using the set screw 184 in the coupler 178 to mount the disc drive mount 176 on the stub axle 270 and adjusting the position of the disc drive mount 176 along the longitudinal and transverse axes, 198 and 232 respectively, by way of the slots 190, 192, 194 and 196 formed through the flange 188 of the coupler 178 and the slots 224, 226, 228 and 230 formed through the disc drive mounting plate 222 that pass screws that attach the base plate 214 and disc drive mounting plate 222 to the coupler 178 and end walls 218 and 220 respectively. Fine balancing can then be effected using small weights that are attached to the upper surface of the disc drive mounting plate 222, as indicated at 272 in FIGS. 4 and 5.

The balancing of the disc drive mount 176 and disc drive 100 prior to measurement of the stiction and friction between the heads and discs of the disc drive prevents excessive vibration of the disc drive spin assembly 152 that would not only give rise to electrical noise but could cause damage both to the assembly 152, the disc drive 100, or both. Further, such vibration could loosen screws that are used to connect parts thereof together to present a hazard when the spin-up motor 170 is operated during a measurement as discussed below. As a further safeguard against the possible dislodgment of parts during a stiction/friction measurement, the disc drive spin assembly 152 is preferably further comprised of an aluminum hood 274 that is hingedly connected to the cabinet 156 for rotation between open and closed positions in which the disc drive mount 176 is alternatively accessible and fully enclosed, as indicated in FIG. 2.

As noted above, the disc stack 102 of a disc drive 100 will generally not be coaxial with the spin-up motor shaft 174 when the disc drive is mounted in the disc drive mount 176 and the disc drive mount is, in turn, mounted on the spin-up motor shaft 174. That is, as particularly shown in FIG. 6, an offset will typically exist between the axes 276 of the disc stack 102 and the spin-up motor shaft 174 when the disc drive and disc drive mount have been balanced so that the center of mass of the combination is along the axis of the spin-up motor shaft 174. Further, as will become clear from the discussion of the measurement of stiction and friction to be presented below, this offset will, at least in theory, introduce an experimental error into the measurements. Consequently, it would at first glance appear desirable to eliminate the offsets by positioning the disc drive on the disc drive mount so as to coextensively align the disc stack 102 with the spin-up motor shaft 174 and to use weights mounted on the disc drive mount to balance the combined disc drive and disc drive mount about the spin-up motor shaft. While such measures could be taken, they are not necessary.

Particularly, the experimental error introduced into the measurements by an offset between the axes of the disc stack and the spin-up motor shaft depends upon an imbalance of the disc stack 102 on the disc drive case 114 and, as is known in the art, the disc stack of a disc drive is very carefully balanced at the time the disc drive is manufactured. Consequently, experimental error that might be introduced into the stiction and friction measurements by offsets between the axes of the disc stack 102 and spin-up motor shaft 174 has been found, as a practical matter, to be negligible. Thus, the apparatus 150 can be advantageously configured to accommodate a variety of disc drive model types.

Referring now to FIG. 3, an input/output (I/O) card 280 is mounted in an expansion slot of the computer 154 to permit control of the spin-up motor 170 by the computer 154 and to make measurements from which the stiction and friction between heads and discs of a computer are determined. While substantially any commercially available I/O card could generally be used for the card 280, a particularly suitable I/O card is the Model AT-M10-16F Multipurpose Analog Card, manufactured by National Instruments of Austin, Tex. Such card can take and store numerous samples of several analog signals, each with respect to its own reference signal and, additionally, can receive from a computer in which it is mounted a large number of commands which it can store for output, upon command, to an external device. In the present invention, these commands are velocity commands that are outputted to the motor driver 175 on a bus that has been indicated by the arrow 282 in FIG. 3. Signals that are sampled and stored by the I/O card 280 for transfer to the computer 154 memory include a motor speed signal, indicated by the arrow 284 in FIG. 3, that is generated for speed control by the motor driver 175. The motor speed signal is proportional to the angular velocity of the shaft 174 of the spin-up motor and the proportionality constant can be readily determined using a stroboscope to determine the rotational speed of the spin-up motor while measuring the motor speed signal at appropriate terminals in the motor driver.

The signals sampled by the I/O card 280 also include the voltages at the ends of all but one of the windings of the disc drive spindle motor 112 relative to the voltage at the end of the remaining winding. Thus, where the disc drive spindle motor is a three phase motor as illustrated in FIG. 3, the I/O card 280 samples voltages at the ends of windings 286 and 288 relative to the voltage at the end of winding 290 by way of a slip ring assembly 292 and conducting paths 294, 296 and 298. A suitable slip ring assembly 294 for use in the present invention is the model MX-6/ST slip ring assembly available from Meridian Laboratories of Middleton, Wis. Such slip ring assembly has a tubular, rotating shaft from which conductors leading from internal slip rings extend to the lower end of the spin-up motor shaft 174 via a tubular coupling 302 as shown in FIG. 2. More particularly, these conductors extend upwardly from the slip ring assembly 292, through the spin-up motor shaft 174 and to a connector assembly 304 (FIGS. 4–7) so that electrical connections are made to the ends of the windings of the spindle motor 112.

As shown in FIGS. 4–6, the connector assembly 304 comprises a support member 306 that is attached to one leg of the "U" of the disc drive mounting plate 222 by screws 308, 310 and has an L-shaped arm 312 that extends over the opening between the legs of the mounting plate 222. As will be clear to those skilled in the art, the end of the arm 312 can be caused to overlay any portion of a disc drive 100 that is mounted in the disc drive mount 176 by appropriate dimensioning of the arm 312 and a suitable location is a location adjacent the electrical connector (not shown) by way of which the disc drive 100 is electrically connected to a computer. More particularly, the end of the arm 312 overlays a location adjacent portions of the disc drive connector by way of which electrical power is supplied to the spindle motor. The connector assembly 304 further comprises a plastic pin block 314 to which is attached a plastic pin cap 316 in which are embedded pins 318 that pass through the block 314 and protrude from the pin cap 316. The upper end of the pin block 314 is secured to the distal end of the arm 312 by way of screws, one of which is shown at 320 in FIG. 4, and a rubber pad 322 is sandwiched between the arm 312 and the block 314.

The thickness of the pad 322 and the lengths of the pins 318 are selected so that the pins will be forced against pins of the electrical connector of a disc drive 100 that supply power to the spindle motor when the disc drive 100 is mounted in the disc drive mount 176. Thus, electrical contact between the slip rings of the slip ring assembly 292 and the windings of the spindle motor can be made by forcing a jack 324 on the ends of the wires leading from the slip rings onto the upper ends of the pins 318.

Referring again to FIG. 3, the connections between the slip rings of the slip ring assembly 292 and the spindle motor windings includes a connection to the common point of the windings. This point is connected to the computer ground and the cabinet 156 to suppress electrical noise.

Operation

Figure 8:
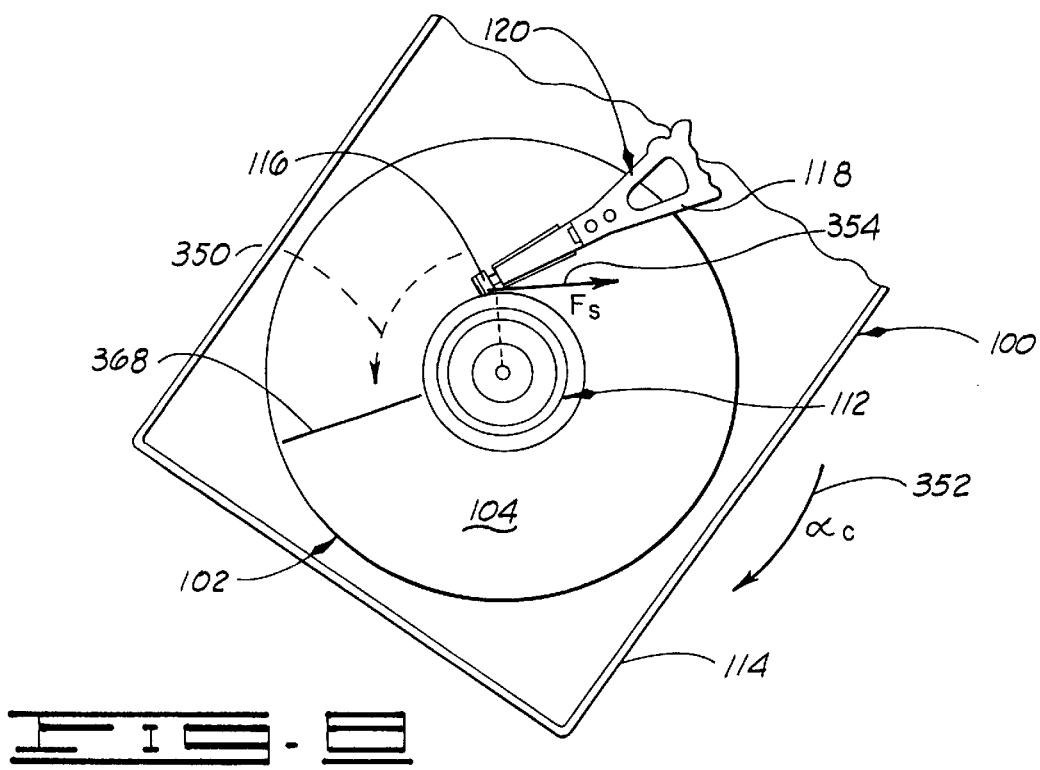
FIG. 8 is a top view of portions of the disc drive of FIG. 1, illustrating the relative positions of the case and disc stack for small angular accelerations of the disc drive.
Figure 9:
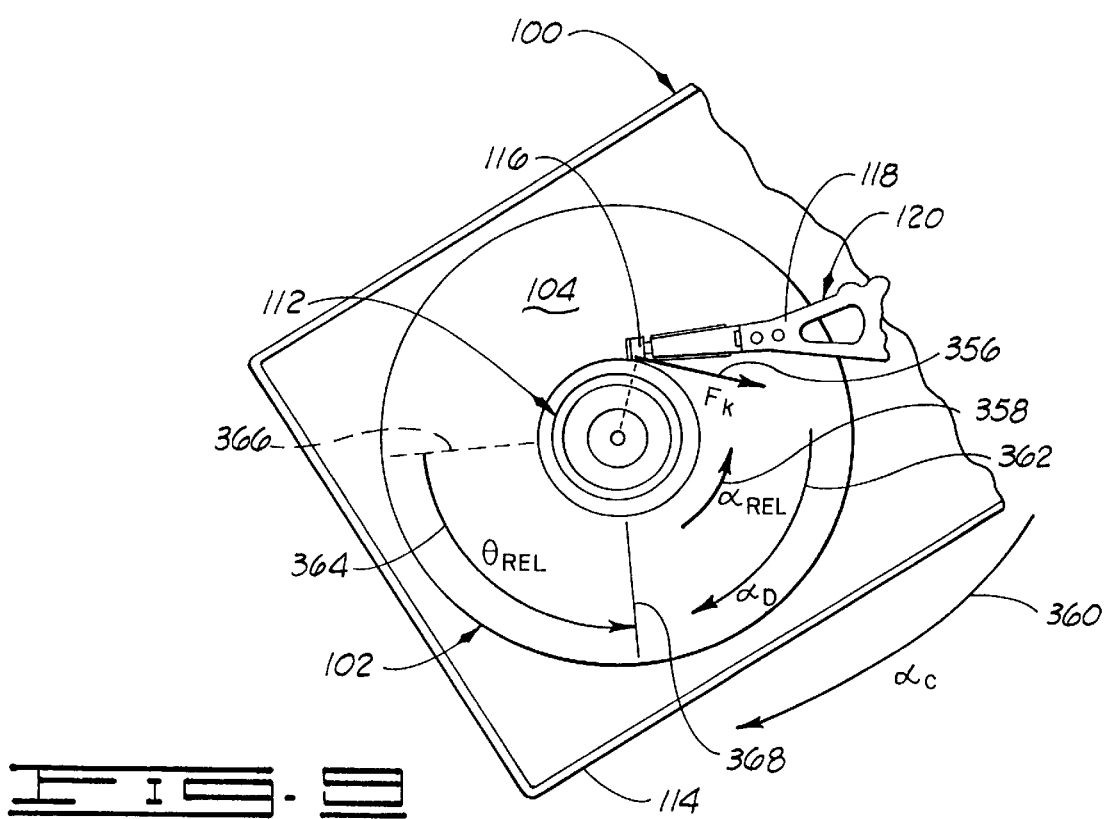
FIG. 9 is a top view of the portions of the disc drive shown in FIG. 8 illustrating the relative positions of the case and disc stack for large angular accelerations of the disc drive.

To more fully describe the manner in which the apparatus 150 measures the stiction and friction between the heads and discs of the disc drive 100, it will be useful to first present an overview of the measurement methodology before considering preferred programming of the computer by way of which the measurements are preferably implemented. FIGS. 8 and 9, which are portions of a top view of the disc drive 100 with the cover removed, have been presented for this purpose.

Initially, as has been noted above, the disc drive 100 for which a stiction/ friction measurement is to be made is conveniently mounted in the disc drive mount 176 by way of threaded mounting holes formed in the underside of the case 114 of the disc drive 100 so that the disc drive will be inverted while the measurement is made. Not only does this facilitate the mounting of the disc drive in the mount 176 but, further, it makes the disc drive electrical connector (which is generally located on a printed circuit board attached to the underside of the disc drive case), readily accessible to the connector assembly 304 mounted on the mounting plate 222 of the disc drive mount 176, as described above.

Accordingly, while FIGS. 8 and 9 are top views insofar as the disc drive 100 is concerned, FIGS. 8 and 9 provide views looking upwardly from the base plate 214 insofar as the disc drive mount 176 is concerned. Thus, directions illustrated in FIGS. 8 and 9 (that is, directions to which reference will be made in describing the stiction/friction measurement), will be mirror images of the directions as they would be seen looking directly down upon the stiction/friction measurement apparatus 150.

Referring first to FIG. 8, for purposes of clarity the dashed, arcuate arrow 350 illustrates the direction in which the disc stack 102 normally rotates during the operation of the disc drive 100. In the preferred practice of the invention, the disc drive 100 is rotated in the opposite direction as indicated by the arrow 352 that has been marked $\alpha_C$ to indicate the angular acceleration of the case 114 of the disc drive. Thus, if the discs of a disc drive normally rotate in a counterclockwise direction as viewed from above the disc drive, the case is operated in a clockwise direction, as the case would be viewed from above. In view of the inversion of the disc drive in the disc drive mount 176, this translates into a counterclockwise rotation of the disc drive mount as seen from above the stiction/friction measurement apparatus 150. Thus, for the case in which the disc drive is mounted up side down in the disc drive mount 176, the mount 176 is turned, as viewed from above, in the same direction during a stiction/friction measurement that the disc stack 102 rotates, as viewed from above, during normal operation. If the disc drive is mounted right side up, these rotation directions are opposites of each other.

To carry out the stiction/friction measurement, the spin-up motor 170 (FIG. 2) is operated so as to cause its shaft 174 and, consequently, the disc drive mount 176 and disc drive case 114 to angularly accelerate at a rate that steadily increases from zero. To this end, a series of velocity commands are outputted to the motor driver 175 and such commands are predetermined so that, preferably, they increase from zero at a rate that is proportional to time. That is, the rate of change of the angular acceleration ("jerk") of the motor shaft 174, the disc drive mount 176 and the case 114 of the disc drive 100 about the axis of the shaft 174 will be substantially constant. During the measurement, the actuator 120 is latched in place so that the heads 116 will rotate with the case to exert a frictional force on the discs as indicated by the arrows 354 and 356 in FIGS. 8 and 9 respectively. This frictional force will, of course, cause the disc stack 102 to undergo an angular acceleration that is in the same direction as the angular acceleration $\alpha_C$ of the case 114.

Because the angular acceleration of the disc drive case is initially zero, the force required to cause the disc stack 102 to accelerate with the case 114 will initially be less than the maximum static friction force that can be exerted on the discs by the heads with the result that the frictional force $F_S$ exerted on the discs by the heads will be just the value necessary to prevent slippage of the discs across the heads. Accordingly, the discs 104 will also angularly accelerate with the case 114 at the rate $\alpha_C$. However, because the angular acceleration of the case 114 increases with time, the force required to maintain angular acceleration of the disc stack 102 with the case 114 can eventually reach the maximum static friction force the heads 116 can exert on the discs 104. Beyond the angular acceleration of the case for which this occurs, the disc stack 102 will slip with respect to the heads so that a relative angular acceleration $\alpha_{REL}$ of the disc stack 102 with respect to the case 114, in a direction opposite the angular acceleration $\alpha_C$ of the case 114, will occur as illustrated by the arrows 358 and 360 in FIG. 9.

When relative motion of the disc stack 102 with respect to the case 114 occurs, the disc drive motor 112 will operate as a generator so that the onset of the relative motion will be marked by the appearance of voltages across the pairs of windings 286 and 288 and 286 and 290. At the point at which the relative motion between the disc stack 102 and case 114 begins, the angular acceleration of the disc stack 102 will be the same as the angular acceleration of the case. Thus, a total stiction value, corresponding to the total static friction force exerted by the heads on the discs, can be determined by multiplying the angular acceleration of the case by the moment of inertia of the disc stack and dividing by the radius of the landing zone. The stiction per head can then be found by dividing by the number of heads.

Thus, in accordance with the preferred embodiment of the present invention, the angular velocity of the disc drive case 114 is repetitively sampled, through the sampling of the angular velocity of the spin-up motor shaft 174 developed by the motor driver 175, so that the angular acceleration of the case can be determined for an ith sample period in accordance with the following relationship:

$$\alpha_{C_i} = \frac{1}{2} f_S(\omega_{C_{i+1}} - \omega_{C_{i-1}}) \tag{1}$$

where $f_S$ is the sampling frequency and $\omega_{C\ i+1}$ and $\omega_{C\ i-1}$ are the angular velocity samples for the (i+1)th and (i−1)th samples respectively.

Further, the voltages at the ends of the windings 286, 288 and 290 of the disc drive spindle motor 112 are concurrently sampled to detect the sample period in which slippage between the heads and discs of the disc drive 100 occurs. The stiction is then determined from the angular acceleration determined for the sample period in which slippage is detected as described above.

By continuing to sample the angular velocity of the case, the friction between the heads and discs can also be measured. Following the onset of slippage between the heads 116 and discs 104, the kinetic friction force $F_K$ will be constant and will cause the disc stack 102 to undergo angular acceleration at a rate $\alpha_D$, as represented by the arrow 362 in FIG. 9. The angular acceleration $\alpha_D$ will be related to the angular $\alpha_C$ in accordance with the following relationship:

$$\alpha_D = \alpha_C - \alpha_{REL} \tag{2}$$

where $\alpha_{REL}$ is the relative angular acceleration of the disc stack 102 with respect to the case 114.

During the continuation of spin-up of the motor 170, the angular acceleration of the case 114 is determined for each sample time, other than the first, from the samples of the spin up motor angular velocity as described above and the relative angular acceleration of the disc stack 102 with respect to the case 114 is determined from samples of the voltages at the ends of the windings 286, 288 and 290 of the disc drive spindle motor 112. To this end, the orientation of the disc stack 102 with respect to the disc drive case 114, as measured by the angle $\theta_{REL}$ indicated at 364 in FIG. 9 between a reference line 366 defined below and an arbitrary radius 368, can be shown to be given by the following relationship:

$$\theta_{REL} = K\tan^{-1}\left[\frac{(\Delta\epsilon_2 - \Delta\epsilon_1)\sin 120°}{(\Delta\epsilon_2 + \Delta\epsilon_1)(1 - \cos 120°)}\right] \tag{3}$$

where $\Delta\epsilon_1$ is the emf induced across the windings 286 and 290, $\Delta\epsilon_2$ is the emf induced across the windings 286 and 288 and K is a conversion factor that converts electrical degrees to mechanical degrees. As is known in the art, the emfs induced in the windings of a polyphase motor during rotation of the rotor is a periodic signal that passes through several periods for each period of rotation of the rotor, the number of such periods depending upon the structure of the motor in a known way. From this relationship, the reference line 366 is defined to be any position of the line 368 for which the angle $\theta_{REL}$ determined from equation (3) is zero. Equation (3) can be numerically differentiated twice to yield the relative angular acceleration of the disc stack 102 with respect to the case 114. Thus, for the ith sample time after the onset of slippage between the heads 116 and discs 104:

$$\omega_{REL_i} = \frac{1}{2} f_S(\theta_{REL_{i+1}} - \theta_{REL_{i-1}}) \tag{4}$$

and $$\alpha_{REL_i} = \frac{1}{2} f_S(\omega_{REL_{i+1}} - \omega_{REL_{i-1}}) \tag{5}$$

where $\theta_{REL\ i}$ is the value of $\theta_{REL}$ determined from equation (3) at the ith sample time, $\omega_{REL\ i}$ is the angular velocity of the disc stack 103 relative to the case 114 at the ith sample time, $\alpha_{REL\ i}$ is the relative angular acceleration in the ith sample time and $f_S$ is again the sampling frequency. In the preferred practice of the invention, the relative angular acceleration between the disc stack 102 and the case 114 and the angular acceleration of the disc drive case are determined for a plurality of sample times, the angular acceleration of the disc stack 102 at those sample times is determined using equation (2) and averaged, and the kinetic friction force (friction) is determined by multiplying the average disc stack acceleration by the moment of inertia of the disc stack 102 and dividing by the radius of the landing zone. As in the case of stiction, the friction per head can then be determined by dividing by the number of heads.

Before proceeding to the programming of the computer 154, two points about the above description of the inventive method should be noted. First, equation (3) for the angle $\theta_{REL}$ that describes the orientation of the disc stack 102 with respect to the case 114 of the disc drive 100 is derived on the assumption that the emf induced in a winding of a DC motor by rotation of its rotor has the general form of a sine function at a multiple of the rotation frequency. As is known in the art, this emf will also include harmonics of such sine function. The effect of the harmonics in the emfs induced in the windings is eliminated by filtering winding voltage sample tables as will be discussed below. Such filtering is also used to suppress noise in the measurements and thereby enhance the accuracy of the measurements.

Secondly, equation (3) describes the orientation of the rotor of a three phase spindle motor. It is readily extendable to DC motors that operate in a different number of phases, however, by replacing the angle of 120 in the equation with 360/n, where n is the number of phases of the motor, and using voltages at the ends of three consecutive windings to determine the emfs $\Delta\epsilon_1$ and $\Delta\epsilon_2$.

Programming

Figure 10:
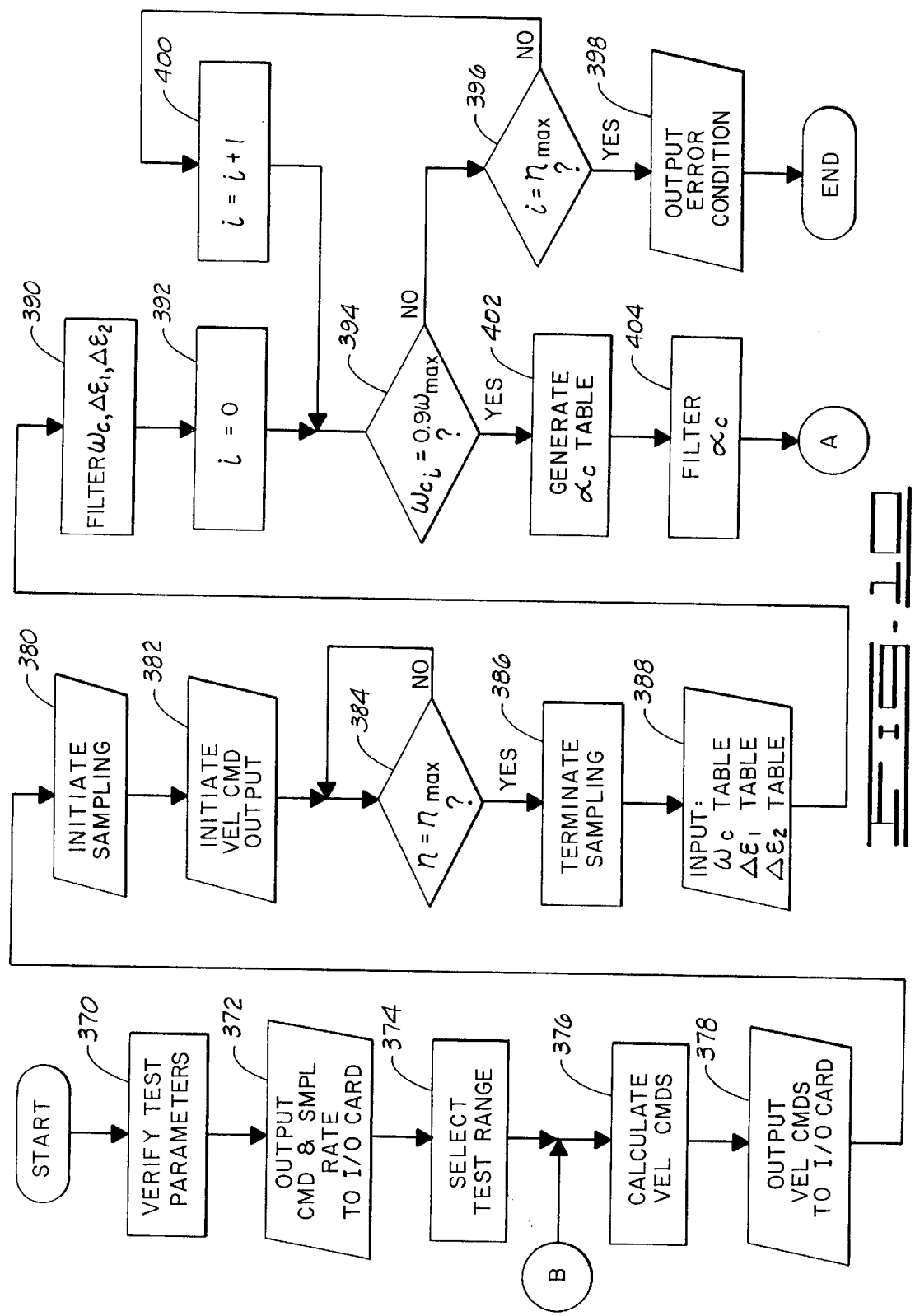
FIGS. 10 through 12 are flow charts illustrating general programming steps for the computer of the apparatus of FIG. 2.

Flow charts outlining programming steps in accordance with the considerations discussed above are presented in FIGS. 10, 11 and 12 to which attention is now invited. As shown in FIG. 10, the program begins with standard programming, indicated at step 370, in which the user of the apparatus 150 is afforded an opportunity to adjust any parameters, such as the moment of inertia of the disc stack 102 or the radius of the landing zone, that are used in determining the stiction and friction. The parameters, of course, are related to the specific to the model of the disc drive being tested and will consequently be adjusted whenever the need arises because of a change in the disc drive for which the stiction and friction are to be measured. Other parameters that might be adjusted include any parameter that enters into the discussion to follow. Preferably, this verification step is carried out using standard programming that displays parameters which might be adjusted for identification of those to be adjusted and entry of new values for the identified parameters.

Following the verification of parameters, the computer outputs to the I/O card 280, at step 372, the rate at which velocity commands are to be outputted to the motor driver 175 and the rate at which the angular velocity of the spin-up motor and the voltages at the ends of the windings 288 and 290, relative to the voltage at the end of the winding 286, of the disc drive spindle motor are to be sampled. Preferably, both rates are the same and a typical command and sample rate is 2 kilohertz.

A range of stiction and friction values is then selected at step 374. As will be clear to those skilled in the art, a practical maximum value for the stiction is a value that the disc drive spindle motor 112 cannot overcome and, as will be discussed below, the measurements are discontinued if the stiction attains this value. The disc drive, in that case, is no longer operable. In the preferred practice of the invention, the range from zero to this practical maximum is further divided into smaller ranges, typically three, and the measurements are made using the least of these smaller ranges for which results can be obtained to maximize the precision of the measurements. In particular, because the angular acceleration of the disc drive mount 176 is increased uniformly to a maximum value that is proportional to the stiction at the top of a range, each change in sample count corresponds to a change in acceleration that is proportional to the maximum stiction. Consequently, limiting the stiction range limits the uncertainty in the acceleration of the case 114 at which slippage begins.

Following the selection of a test range, the velocity commands that are to be outputted to the motor driver 175 by the I/O card 280 are calculated, step 376, and transferred to memory in the I/O card, step 378. These commands can be suitably calculated as follows. Initially, the maximum angular acceleration the disc drive mount 176 and case 114 of the disc drive being tested are to reach is calculated using the criterion that the maximum force that will be exerted by the heads 116 on the discs 104, if no slippage occurs, is to be 110% of the maximum stiction selected at step 374. If this maximum value, per head, is $F_{MAX}$, the maximum acceleration will be:

$$\alpha_{MAX} = \frac{1.1 F_{MAX} \mu_r}{I} \qquad (6)$$

A selected maximum index for spin-up is then selected to cause the disc drive mount 176 to have a selected maximum angular velocity $\omega_{MAX}$ when the mount attains the maximum angular acceleration. This maximum spin-up index will be given by:

$$n_{MAX} = \frac{2\omega_{MAX} f_s}{\alpha_{MAX}} \qquad (7)$$

where $f_s$ is the sampling and command rate outputted to the I/O card at step 372. For other indices, the angular velocity commands during spin up of the disc drive mount will be given by:

$$\omega_n = \frac{\alpha^2_{MAX} n^2}{4\omega_{MAX} F_s^2} \qquad (8)$$

Insofar as only the measurement of the stiction and friction are concerned, no further angular velocity commands are needed in the operation of the apparatus 150. However, at the conclusion of a measurement in which slippage between the heads and discs does occur (that is, a measurement necessary to measure friction), the disc stack 102 will be rotating in the same direction as the disc drive mount 176 and case 114 of the disc drive 100. Consequently, if the disc drive mount 176 is halted too rapidly, the disc stack 102 can undergo relative rotation with respect to the case 114 that is in the direction opposite the direction 350 in which the disc stack normally rotates. As will be recognized, such reverse rotation can result in damage to the discs and heads. To avoid this damage, the disc drive mount is brought to rest by way of a sequence of angular velocity commands for indices $n_{MAX}+1$ through 11 $n_{MAX}$ that are given by:

$$\omega_n = \frac{(0.1\alpha_{MAX})^2 (11 n_{MAX} - n)^2}{4\omega_{MAX} f_s^2} \qquad (9)$$

Such relation decreases the angular acceleration to zero at a rate that is a tenth the rate of increase of acceleration used during spin up and will prevent reverse rotation of the disc stack from occurring.

Once the angular velocity commands have been calculated and transferred to memory in the I/O card 280, the computer 154 issues a command to the I/O card to begin sampling the angular velocity of the shaft 174 of the spin-up motor 170 and the voltage differences $\Delta\epsilon_1$ and $\Delta\epsilon_2$ across the pairs of windings 286, 288 and 286, 290 respectively (as indicated by step 380), and a command to begin outputting the velocity commands to the motor driver 175, step 382. The computer 154 then repetitively polls the I/O card 280, step 384, to determine the index of the most recent velocity command outputted to the motor driver 175 and when this index reaches the maximum index for spin-up (i.e., $n_{MAX}$) a command is issued to the I/O card 280 to terminate sampling, step 386, and inputs the samples that have been taken by the I/O card at step 388. As will be clear form the above, these samples will form tables that list values that the angular velocity $\omega_C$ of the disc drive mount 176 and emfs $\Delta\epsilon_1$ and $\Delta\epsilon_2$ induced in the pairs of windings will have at the times the samples are taken. These tables are then filtered, step 390, to suppress noise in all of the measurements and to limit harmonics in the emf tables. A suitable filter program for this purpose is LABWINDOWS/CVI available from National Instruments of Austin, Tex., a program that has fifth order Butterworth characteristics with a selectable cut off frequency. A suitable criterion for selecting the cut off frequency, which can be selected for each of the tables independently of the others, is the lowest cut off frequency that will not vary the general shape of a display of the tabulated data.

The filtering of the disc drive mount angular velocity table and the emf tables is followed by a test of whether the disc drive mount 176 and disc drive case 114 attained an angular velocity of at least 90% of the maximum angular velocity $\omega_{MAX}$ used to determine the velocity commands outputted to the motor driver 175 during spin up of the disc drive mount 176. More particularly, an index i is initialized to zero, step 392, after which the angular velocity $\omega_{C\,i}$ for ith sample time is compared to 90% of the angular velocity $\omega_{MAX}$, step 394. For those values of the index i for which $\omega_{C\,i}$ is less than 90% of $\omega_{MAX}$, the index i is compared to the index $n_{MAX}$ that corresponds to the largest angular velocity command issued to the motor driver 175, step 396, and, if the index has reached such maximum spin up index, the computer 154 outputs an indication to its monitor that the case 114 and mount 176 did not attain an angular velocity that is at least 90% of the maximum velocity command, step 398, and the program ends. If the index i is less than $n_{MAX}$, it is incremented, step 400, and the program returns to step 394 to compare the next sample of the angular velocity of the case 114 and disc drive mount 176 to 90% of the maximum angular velocity $\omega_{MAX}$. Because the incrementing of the index i will cause the index to eventually reach the maximum index $n_{MAX}$ that will terminate the program if the angular velocity of the disc drive case 114 and the disc drive mount 176 have not reached at least 90% of the maximum angular velocity $\omega_{MAX}$, the program will be terminated unless the 90% value was attained during spin up of the disc drive case 114 and mount 176. The purpose of this test will become clear below.

When, as will generally be the case, the disc drive case 114 and the disc drive mount 116 attain an angular velocity of at least 90% of $\omega_{MAX}$, the computer generates a table of angular accelerations of the disc drive case 114 and mount 176, step 402, as a function of sample numbers beginning with the second sample, by repetitive application of equation (1) above and filters the angular acceleration table, step 404, again using the aforementioned filter program. Following the filtering of the disc drive case 114 and mount 176 angular acceleration table, the program turns, as shown in FIG. 11, to the determination of whether breakaway (slippage) between the heads 116 and discs 104, occurred during the spin-up of the disc drive case 114 and mount 176.

Figure 11:
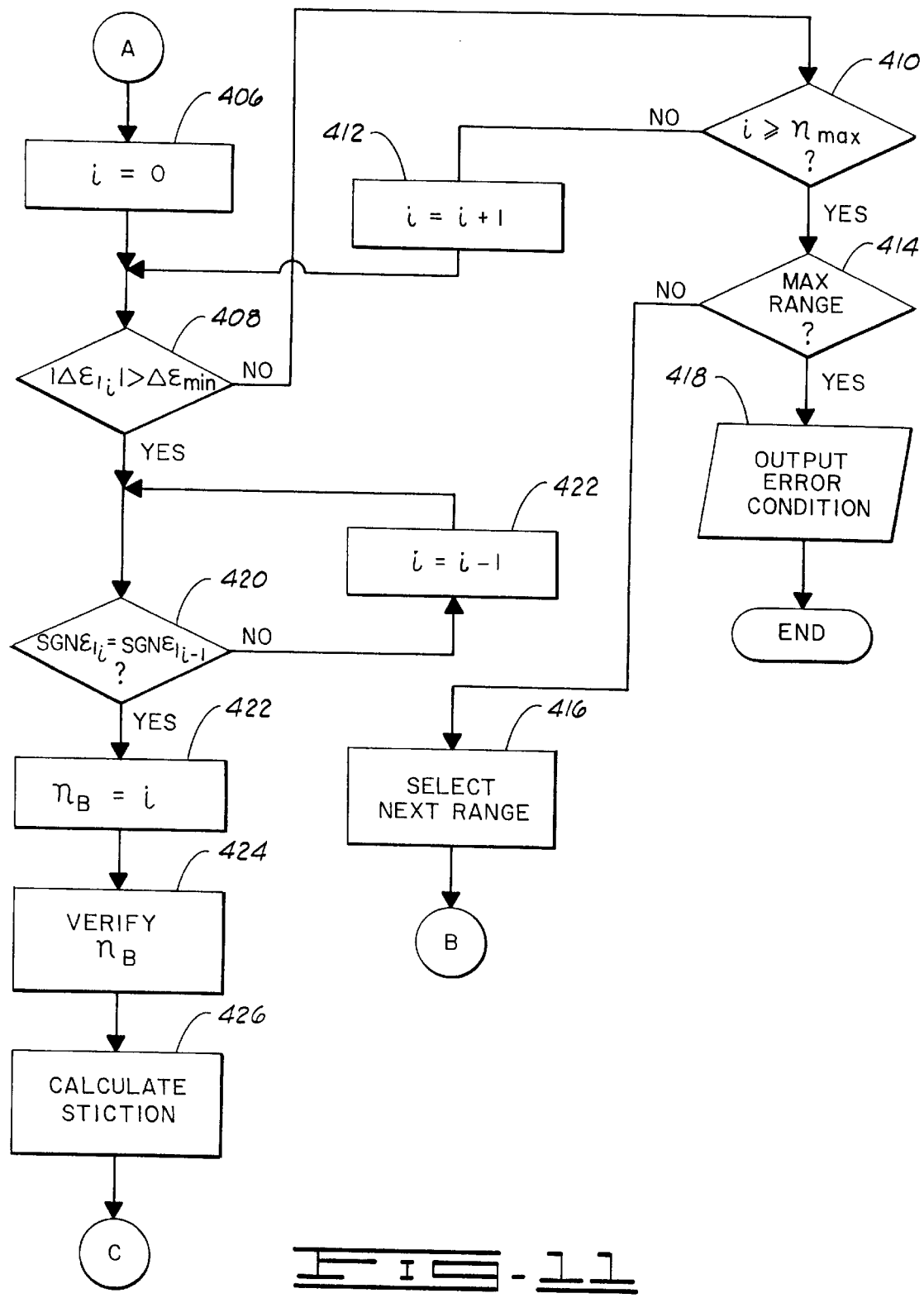

Referring to FIG. 11, the determination of whether breakaway occurred begins with the reinitialization of the index i to zero, step 406, followed by a comparison, step 408, of the absolute value of the ith sample of the difference between the voltages at the ends of windings 286 and 288 of the disc drive spindle motor 112 to a minimum value $\Delta\epsilon_{MIN}$ that is selected to exceed noise in the measurement of the voltage difference. If breakaway has not occurred at least by the time the ith sample was taken (that is, if no emf has been induced in the windings 286 and 288 by relative motion between the disc stack 102 and the disc drive case 114), the comparison will indicate that the absolute value of the ith voltage difference is less than $\Delta\epsilon_{MIN}$ and a test is then made, step 410, to determine whether the index i has reached the maximum index $n_{MAX}$ that corresponds to the maximum velocity command issued to the motor driver 175. If not, the index i is incremented, step 412, and the program returns to step 408 for testing of the magnitude of the next sample of the voltage difference $\Delta\epsilon_1$. If the index has reached $n_{MAX}$, the computer determines whether the measurements were carried out for the highest range for which stiction and friction might be measured, step 414, and if not, selects the next higher range, step 416, and returns to step 376 for calculation of a new set of velocity commands and another spin up of the disc drive case 114 and mount 176. If the spin up occurred using the maximum stiction and friction test values to determine the velocity commands, the computer 154 displays a message, step 418, that the stiction exceeds the maximum force that can be overcome by the disc drive spindle motor 112; that is, the program determines that the disc drive is inoperable.

It should be noted that it is this manner of determining that a disc drive is inoperable that underlies the previous test of whether the disc drive case 114 and mount 176 reached 90% of the maximum commanded angular velocity. When coupled with the determination of the maximum angular velocity on the basis that the frictional force between the heads 16 and discs 104 is to reach 110% of the stiction at the upper end of the test range, the angular velocity test ensures that a lack of occurrence of breakaway for the highest test range did not occur because of a failure of the apparatus 150 to angularly accelerate the disc drive case 114 and mount 176 at a rate that will cause breakaway if the stiction is within the test range.

If the disc drive being tested is operable, the comparison at step 408 will eventually result in the detection of a voltage difference at the ends of windings 286 and 288 of the disc drive spindle motor 112 and a test is then carried out to determine the sample at which breakaway occurred. In particular, the sign of the sample of the voltage difference for which breakaway was detected is compared, step 420, to the sign of the previous sample of the voltage difference and if, these signs are the same, the index i is decremented, step 422, for comparison of the signs of the preceding two samples of the voltage difference. The sample index for which a sign reversal is detected is then selected as a tentative breakaway index $n_B$, step 422. Once the tentative breakaway index has been determined, it is verified, step 424, by repeating the steps beginning with 420 using the voltage difference $\Delta\epsilon_2$ between the ends of winding 286 and 290.

It will be noted that such verification is made without reinitializing the index i so that, if the breakaway index determined from the voltage difference between the ends of the windings 286 and 290 is not the same as the voltage difference between the ends of the windings 286 and 288, the smaller of the two indices will be determined in the verification step. This smaller value is selected in the verification step as the breakaway index that is then used for determination of the stiction between the heads 116 and discs 104 of the disc drive. Such choice is based on the consideration that the voltages at the ends of the disc drive spindle motor windings arising from emf induced in the windings by rotation of the disc stack 102 relative to the disc drive case 114 is a periodic function so that detection of the rise of one of the voltage differences, $\Delta\epsilon_1$ or $\Delta\epsilon_2$, may be delayed by an inappropriate orientation of the rotor of the disc drive spindle motor 112 when breakaway occurs. If this is the case, selection of the earlier of two possible indices as the breakaway index ensures that the sample time at which breakaway occurred will be properly identified.

Once the breakaway index has been identified, the stiction is determined, step 426, by multiplying the angular acceleration of the disc drive case 114 and mount 176 at the sample time identified by the breakaway index by the moment of inertia of the disc stack 102 and dividing by the radius of the landing zone as described above. This value may then be divided by the number of heads the disc drive contains to determine the stiction per head. The computer 154 then turns to the determination of the friction between the heads 116 and discs 104 as illustrated by the flow chart presented in FIG. 12.

Figure 12:
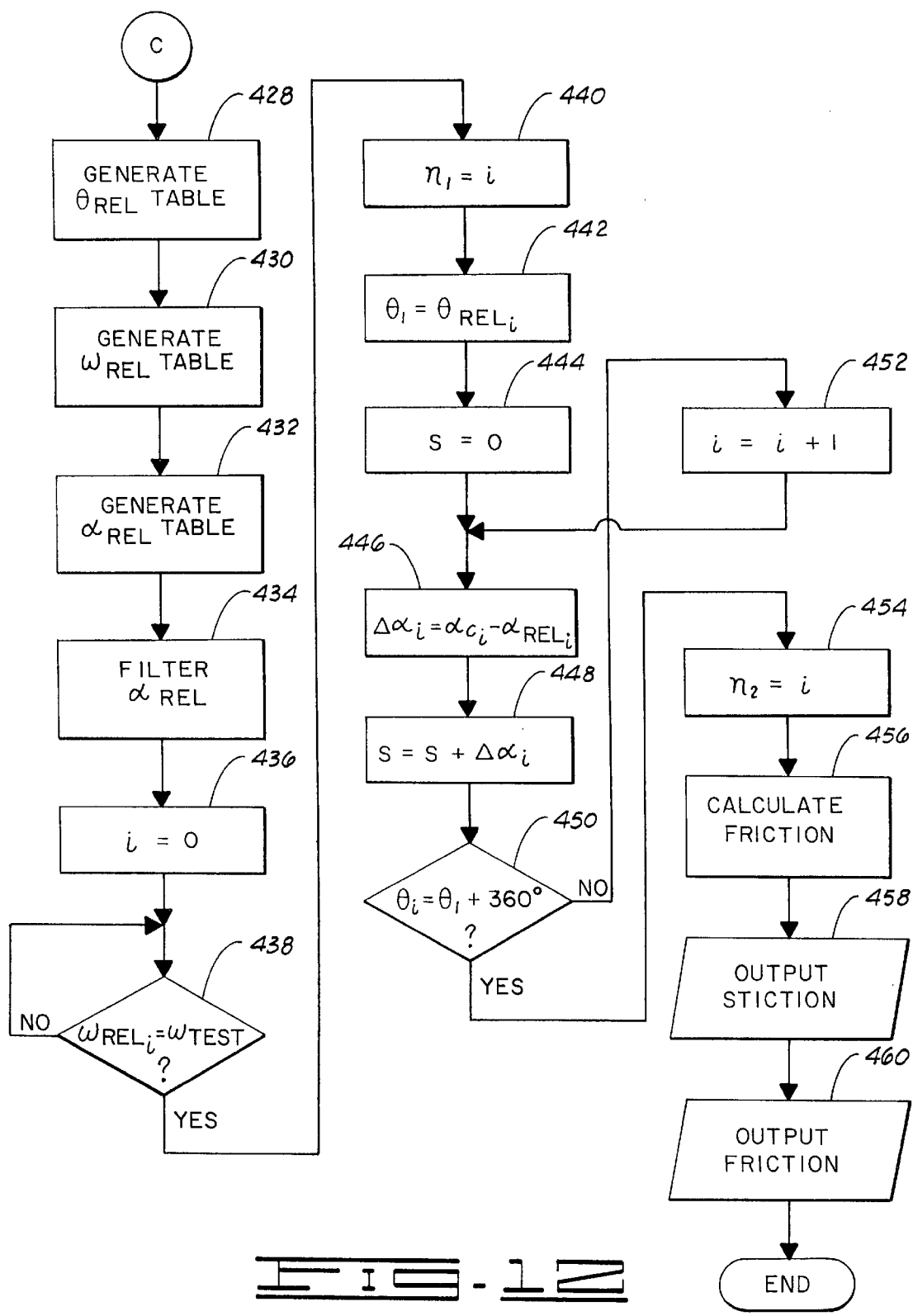

Referring to FIG. 12, the determination of the friction between the heads and discs begins with the generation, at step 428, of a table of orientations of the disc stack 102 when the samples of the voltage differences between the ends of the spindle motor windings 286, 288 and 290 were taken using equation (3) that has been presented above. This table is then twice numerically differentiated to generate, steps 430 and 432, tables of relative angular velocity and relative angular acceleration of the disc stack 102 with respect to the disc drive case 114. The latter is then filtered, step 434, in the same manner that the tables of voltage differences $\Delta\epsilon_1$ and $\Delta\epsilon_2$ were filtered.

As noted above, the frictional forces between the heads 116 and discs 104 are substantially constant once breakaway has occurred and the discs are slipping along the heads. Consequently, the relative angular acceleration $\alpha_{REL}$ of the disc stack 102 and the angular acceleration $\alpha_C$ of the disc drive case 114 for any sample time after breakaway occurred can be used to determine the angular acceleration $\alpha_D$ of the disc stack 102 from equation (2) for determination of the friction between the heads 116 and discs 104. However, any set of measurements will be subject to experimental error giving rise to random variations in the values of the quantities being measured and it common practice to use an average of many measured values as the value of the quantity. The computer 154 is thus programmed to generate such an average for the angular acceleration of the disc stack 102 from which friction between the heads and discs is determined.

Moreover, in the measurement of friction between the heads and discs of a disc drive, a systematic error can exist in values of the relative angular acceleration obtained for higher relative velocities of the disc stack 102 because of aerodynamic forces on the heads 116 arising from the swirling of air by the relative motion of the discs. The computer 154 is programmed to prevent this systematic error from being significant by, initially, limiting the maximum angular velocity $\omega_{MAX}$ that is attained by the disc drive case 114 and mount 176 during spin up of the mount 176. Typically, this maximum angular velocity is selected to be about 2000 rpm. The second technique used to limit the effect of aerodynamic forces on the heads 116 is to use a range of relative angular accelerations that occur for relative angular velocities that are low enough that aerodynamic forces on the heads will be negligible to determine the angular acceleration of the disc stack after breakaway has occurred. As described in the following paragraph, the preferred technique utilized in the programming guarantees a constant and known aerodynamic force upon the head.

Returning to FIG. 12, after initializing an index i, at step 436, that counts the values of relative angular acceleration used in determining the angular acceleration of the disc stack, the relative angular velocities in the table generated at step 430 are compared, step 438, to a test angular velocity $\omega_{TEST}$ that is selected to be high enough only to eliminate slip-stick characteristics of motion that takes place immediately after slippage between two objects in contact begins. The value of the index i for which the angular velocity taken from the table generated in step 430 first attains the test angular velocity is selected, at step 440, as an index $n_1$ that identifies the lower end $\theta_1$ of a range of angles of relative orientation between the disc stack 102 and the disc drive case 114, step 442, over which the angular acceleration of the disc stack 102 is to be averaged.

Once the lower end of the range has been identified, an accumulation value S is initialized to zero, step 444, and an ith difference $\Delta\alpha_i$ between the ith value of the angular acceleration $\alpha_{C\ i}$ of the case 114 and the ith value of the relative angular acceleration $\alpha_{REL\ i}$ of the disc stack 102 with respect to the case 114 is determined, step 446, and added to the accumulation value S, step 448. The angle of orientation of the disc stack 102 for the index i is then compared with the sum of the angle $\theta_1$ at the low end of the range, and 360°, step 450, to determine whether the accumulation has been carried out over a range of orientations of the disc stack 102 that make up one revolution of the disc stack 102 on the disc drive case 114. If, not, the index i is incremented, step 452, and the program returns to the accumulation of angular acceleration differences.

The index for which the a complete revolution of the discs 104 on the case 114 is completed is selected, step 454, as the index $n_2$ that marks the upper end of the range over which the angular acceleration of the disc stack is determined and the friction is then determined, step 456, in accordance with the relation:

$$F_X = \frac{SI}{r(n_2 - n_1)} \quad (10)$$

where S is the final accumulated acceleration difference, I is the moment of inertia of the disc stack about its rotation axis, r is radius of the landing zone and $n_2 - n_1$ is the number of acceleration differences that were accumulated to determine the value of S. Following the calculation of the friction, both the stiction and friction are outputted to the monitor of the computer 154, steps 458 and 460.

DETAILED DESCRIPTION OF THE SECOND PREFERRED EMBODIMENT

As will be appreciated by those skilled in the art, the primary limitation on the precision with which the apparatus 150 can measure stiction and friction between the heads and discs of a disc drive is a result of the use of samples of the back emf generated angular velocity of the shaft 174 of the spin-up motor 170 to determine the angular acceleration of the disc drive mount 176 and, consequently, of the case 114 of the disc drive 100. In particular, the measurement of the angular velocity of the shaft 174 by the motor driver 175 involves the measurement of the current that is passed through the windings of the spin-up motor 170 and the current measurements are sensitive to, for example, fluctuations in the temperature of the motor. More importantly, the differentiation of the back emf generated angular velocity to determine acceleration generates undesirable error/noise, which can be eliminated through the additional use of an accelerometer, as discussed below.

Referring now to FIG. 13, illustrated therein is a modification of the disc drive mount, designated 176', that eliminates motor current measurements to provide an embodiment of the invention that is capable of measuring stiction and friction with greater precision than will the first embodiment of the invention described above, should a need arise for doing so.

As shown in FIG. 13, the disc drive mount 176' differs from the disc drive mount 176 of the first embodiment in that a notch 462 is formed in one end of the base plate 216 to receive an accelerometer 464 which measures accelerations along the direction indicated by the double arrow 466. More particularly, the accelerometer 464 is cemented into the notch 462 and electrical connection between the I/O card 280 and the accelerometer 464 is made via an enlarged slip ring assembly that will accommodate a larger number of conductors than is necessary for the first embodiment. The direction 466 is selected to lie substantially tangentially to a circle centered on the shaft 174 of the spin-up motor 170 so that the accelerometer 464 can be calibrated to measure the angular acceleration of the disc drive mount 176' about the axis of the shaft 174. Accelerometers suitable for use as the accelerometer 464 are the EGA series accelerometers available from Entram Electronics of Fairfield, N.J.

Figure 14:
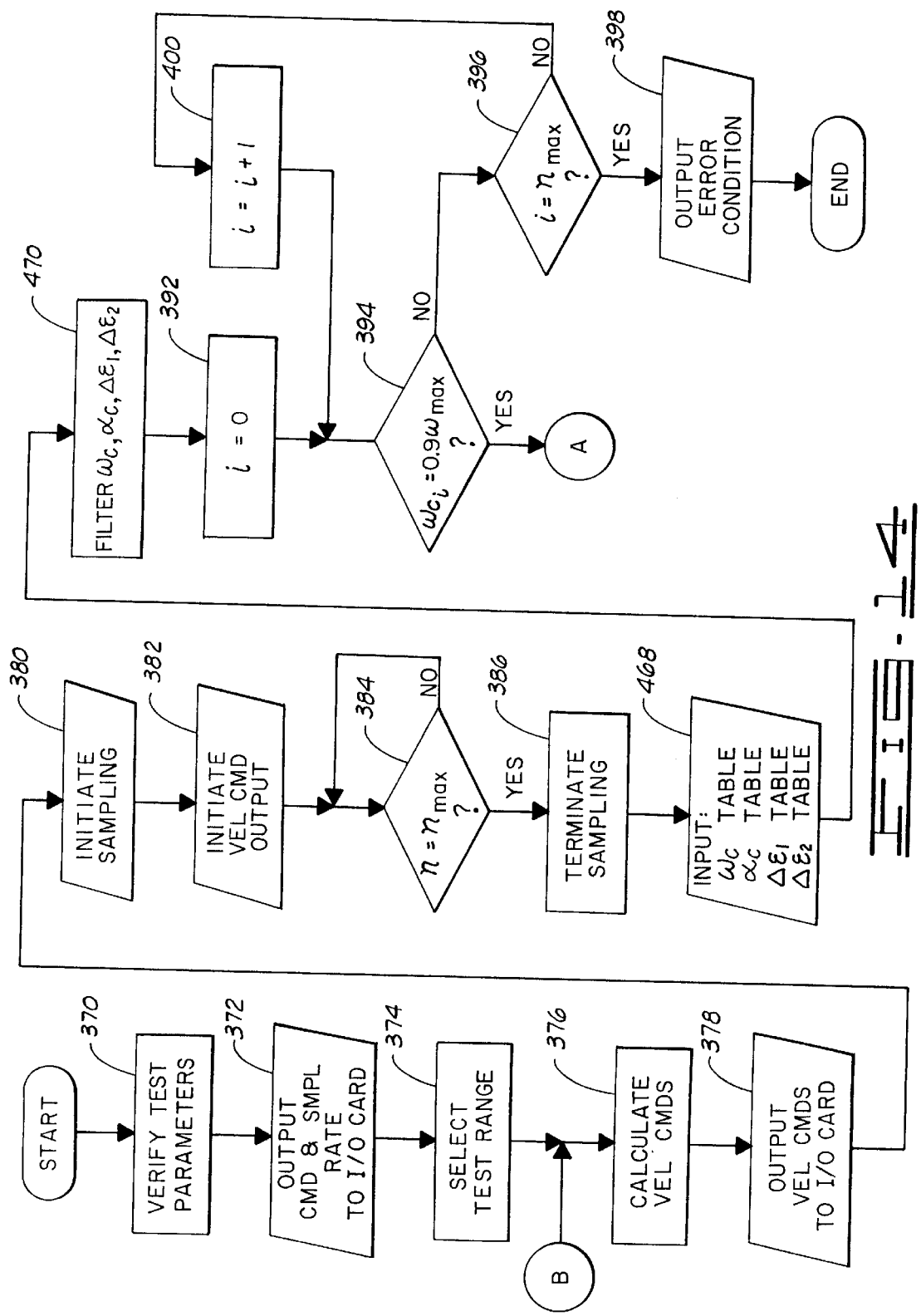
FIG. 14 is a flow chart illustrating modifications of the computer program of FIGS. 10 through 12 for use with the disc drive mount of FIG. 13.

FIG. 14 illustrates the modification of initial portions of the programming of the computer 154 to adapt the programs described above with respect to FIGS. 10, 11 and 12 for use in the second embodiment of the invention. In particular, the modification of the program generally comprises: (1) including the accelerometer output among the quantities to be sampled a step 380 shown in FIG. 10 and carried into FIG. 14; (2) replacing the step 388 of FIG. 10 with a step 468 which includes the angular acceleration table generated by repetitive sampling of the accelerometer 464 by the I/O card 280 among the quantities transferred to the memory of the computer 154 from the I/O card 280; (3) replacing the filtering step 390 of FIG. 10 with a filtering step 470 that includes filtering of the disc drive case angular acceleration table; and (4) deletion of the steps 402 and 404 of FIG. 10 that are used in the first embodiment to determine and filter the angular acceleration of the case 114 from the case angular velocity table inputted at step 388.

In summary, in accordance with the foregoing description the spin-up motor 170 is provided with the rotatable shaft 174 which is rotated in accordance with motor drive current applied by the motor driver 175. The disc drive 100 is mounted relative to the rotatable shaft 174 by way of the disc drive spin assembly 152 and electrical contact is established with the windings 286, 288 and 290 of the spindle motor 112 by an electrical contact assembly, such as the slip ring 294. Measurements of static and kinetic friction between the disc drive heads 116 and the discs 104, 106 and 108 are thus determined by the computer 154 in response to the rotation of the disc drive case 114 and voltages induced in the windings 286, 288 and 290 of the spindle motor 112.

It will be clearly understood that the axis of rotation of the discs will be aligned to be substantially parallel with the axis of rotation of the rotatable shaft of the spin-up motor. The fact that these axes do not have to be coextensively aligned is a significant advantage of the present invention. However, for purposes of the appended claims, parallel alignment of the axes will be read with sufficient breadth to also encompass coextensive alignment of the axes.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus for measuring static friction force and kinetic friction force between a disc of a disc drive and a read/write head positioned adjacent the disc, wherein the disc can be rotated by a disc drive spindle motor mounted to a case of the disc drive, the spindle motor having a plurality of windings through which electrical currents can be passed to rotate the disc with respect to the case of the disc drive about a disc axis, the apparatus comprising:

a spin-up motor having a rotatable shaft, the shaft defining a spin-up motor axis;

a motor driver electrically connected to the spin-up motor for passing a motor drive current through the spin-up motor;

disc drive mounting means for mounting the disc drive case to the spin-up motor shaft, the disc drive mounting means facilitating rotation of the disc drive case about the spin-up motor axis in response to the motor drive current;

spindle motor electrical contact means for facilitating electrical contact with the windings of the spindle motor; and measurement means, connected to the motor driver and the spindle motor electrical contact means, for measuring the static friction force and the kinetic friction force between the disc and the read/write head in response to the rotation of the disc drive case and voltages induced in the windings of the spindle motor.

2. The apparatus of claim 1, wherein the measurement means comprises:

a computer having associated programming to:

transmit a sequence of angular velocity commands to the motor driver so as to angularly accelerate the disc drive case at an ever increasing rate;

repetitively sample the angular velocity of the spin-up motor shaft to determine the angular acceleration of the disc drive case as a function of sample count during angular acceleration of the spin-up motor shaft;

sample voltages at the disc drive spindle motor windings to detect the onset of angular motion of the disc relative to the disc drive case and subsequently determine the angular acceleration of the disc relative to the disc drive case as a function of sample count;

determine the maximum static friction force between the read/write head and the disc from the moment of inertia of the disc and the disc drive spindle motor about the disc axis and the angular acceleration of the disc drive case at which relative motion between the discs and the disc drive case begins; and determine the maximum kinetic friction force between the read/write head and the disc from the moment of inertia of the disc and the disc drive spindle motor about the disc axis and from the angular acceleration of the case and the angular acceleration of the disc relative to the disc drive case.

3. The apparatus of claim 1 wherein the disc drive mounting means comprises:

a coupler having a bore formed on a diameter to receive the spin-up motor shaft for mounting the disc drive mounting means on one end of the spin-up motor shaft, wherein the coupler comprises a flange having a plurality of slots formed therethrough parallel to a longitudinal axis of the coupler flange;

attachment means for attaching the coupler to the spin-up motor shaft at such times that the spin-up motor shaft is received in the bore of the coupler;

a base plate having a plurality of holes formed therethrough to receive fasteners passed through the coupler flange slots, whereby the base plate can be longitudinally positioned on the coupler via positioning of the fasteners in the slots;

two end plates mounted on the base plate at opposite ends of the base plate, wherein the end plates have lower ends fixed to the base plate and opposite upper ends spaced a distance from the lower ends and wherein a plurality of holes are formed in the upper ends of each end plate; and a disc drive mounting plate having transverse slots formed therethrough for mounting the disc drive mounting plate on the end plates via fasteners that pass through the slots of the disc drive mounting plate and into the holes formed in the upper ends of the side plates, whereby the disc drive mounting plate can be transversely positioned on the end plates via positioning of the fasteners in the slots of the disc drive mounting plate.

4. The apparatus of claim 3 further comprising:

a cabinet whereon the spin-up motor is mounted; and a balance shaft pivotally mounted on the cabinet for rotation about a horizontal axis, wherein the balance shaft is characterized as having a stub axle extending to one side of the cabinet and wherein the stub axle has a diameter substantially equal to the spin-up motor shaft whereby the disc drive mounting means can be mounted on the stub axle via the bore of the coupler and fixed thereto by way of the attachment means.

5. An apparatus for measuring the maximum static friction force and the kinetic friction force between discs of a disc drive and read/write heads positioned adjacent the discs, wherein the discs are affixed to a rotor of a disc drive spindle motor mounted to a case of the disc drive, the spindle motor having a plurality of windings through which electrical currents are passed to rotate the discs with respect to the case of the disc drive, the apparatus comprising:

a spin-up motor having a rotatable shaft;

a motor driver electrically connected to the spin-up motor for passing a motor drive current through the spin-up motor, wherein the motor driver is characterized as being of the type that measures the angular velocity of the spin-up motor shaft and adjusts the motor drive current in relation to the difference between the angular velocity of the spin-up motor shaft and an angular velocity command received by the motor driver;

disc drive mounting means for mounting the case of the disc drive on the spin-up motor shaft for rotation of the disc drive case about an axis parallel to an axis of the discs of the disc drive;

an accelerometer mounted on the disc drive mounting means for measuring the angular acceleration of the disc drive case during rotation of the disc drive case by the spin-up motor;

slip ring means for making electrical contacts to the windings of the disc drive spindle motor and to the accelerometer; and measurement means, responsive to the motor driver, the accelerometer and the slip ring means, for measuring the static friction force and the kinetic friction force between the discs and the read/write heads in response to the rotation of the disc drive case and voltages induced in the windings of the spindle motor.

6. The apparatus of claim 5, wherein the measurement means comprises:

computer means connected to the motor drive means and the slip ring means for:

transmitting a sequence of angular velocity commands that increase in amplitude at an ever increasing rate to the motor drive means so as to angularly accelerate the disc drive case at an ever increasing rate during reception of the sequence of angular velocity commands by the motor drive means, repetitively sampling the angular acceleration of the disc drive case as a function of sample count during angular acceleration of the spin-up motor shaft, concurrently sampling voltages at the ends of the disc drive spindle motor windings, whereby the computer means can detect the onset of angular motion of the discs relative to the disc drive case and subsequently determine the angular acceleration of the discs relative to the disc drive case as a function of sample count, determining the maximum static friction force between the heads and the discs from the moment of inertia of the discs and disc drive spindle motor rotor about the disc axes and the angular acceleration of the case at which relative motion between the discs and the disc drive case begins, and determining the kinetic friction force between the heads and the discs from the moment of inertia of the discs and disc drive spindle motor rotor about the disc axes and from the angular acceleration of the case and the angular acceleration of the discs relative to the disc drive case.

7. The apparatus of claim 5 wherein the disc drive mounting means comprises:

a coupler having a bore formed on a diameter to receive the spin-up motor shaft for mounting the disc drive mounting means on one end of the spin-up motor shaft, wherein the coupler comprises a flange having a plurality of slots formed therethrough parallel to a longitudinal axis of the coupler flange;

attachment means for attaching the coupler to the spin-up motor shaft at such times that the spin-up motor shaft is received in the bore of the coupler;

a base plate having a plurality of holes formed therethrough to receive fasteners passed through the coupler flange slots, whereby the base plate can be longitudinally positioned on the coupler via positioning of the fasteners in the slots;

two end plates mounted on the base plate at opposite ends of the base plate, wherein the end plates have lower ends fixed to the base plate and opposite upper ends spaced a distance from the lower ends and wherein a plurality of holes are formed in the upper ends of each end plate; and a disc drive mounting plate having transverse slots formed therethrough for mounting the disc drive mounting plate on the end plates via fasteners that pass through the slots of the disc drive mounting plate and into the holes formed in the upper ends of the side plates, whereby the disc drive mounting plate can be transversely positioned on the end plates via positioning of the fasteners in the slots of the disc drive mounting plate.

8. The apparatus of claim 7 further comprising:

a cabinet whereon the spin-up motor is mounted; and a balance shaft pivotally mounted on the cabinet for rotation about a horizontal axis, wherein the balance shaft is characterized as having a stub axle extending to one side of the cabinet and wherein the stub axle has a diameter substantially equal to the spin-up motor shaft whereby the disc drive mounting means can be mounted on the stub axle via the bore of the coupler and fixed thereto by way of the attachment means.

9. A method for determining the maximum static friction force between a disc of a disc drive and a head positioned adjacent the disc, wherein the disc can be rotated about a rotor of a disc drive spindle motor mounted on a case of the disc drive, the spindle motor having a plurality of windings through which electrical currents can be passed to rotate the discs with respect to the case of the disc drive about a disc axis, the method characterized by:

(a) angularly accelerating the disc drive case at an increasing rate about an axis parallel to the disc axis;

(b) repetitively measuring the angular acceleration of the disc drive case;

(c) measuring voltages induced in the windings of the disc drive spindle motor by rotation of the disc relative to the disc drive case concurrently with the repetitive measurement of the angular acceleration of the disc drive case; and (d) determining the maximum static friction force between the disc and the head from the moment of inertia of the disc and disc drive spindle motor rotor about the disc axis and the angular acceleration of the disc drive case at the onset of relative movement of the disc with respect to the disc drive case.

10. The method of claim 9, further characterized by:

(e) determining the kinetic friction force between the discs and the heads from the moment of inertia of the discs and disc drive motor rotor about the axes of the discs and the angular accelerations of the disc drive case and of the discs relative to the disc drive case.

11. The method of claim 9 wherein step (b) is further characterized by:

(b)(1) repetitively measuring the angular velocity of the disc drive case; and (b)(2) determining a sequence of angular accelerations of the disc drive case from the measurements of the angular velocity of the disc drive case.

12. A method for determining the kinetic friction force between a disc of a disc drive and a head positioned adjacent the disc, wherein the disc can be rotated about a rotor of a disc drive spindle motor mounted on a case of the disc drive, the spindle motor having a plurality of windings through which electrical currents can be passed to rotate the discs with respect to the case of the disc drive about a disc axis, the method characterized by:

(a) angularly accelerating the disc drive case at an increasing rate about an axis parallel to the disc axis;

(b) repetitively measuring the angular acceleration of the disc drive case;

(c) measuring voltages induced in the windings of the disc drive spindle motor by rotation of the disc relative to the disc drive case concurrently with the repetitive measurement of the angular acceleration of the disc drive case;

(d) determining angular accelerations of the discs relative to the disc drive case corresponding to measured angular accelerations of the disc drive case from the voltages induced in the windings of the disc drive spindle motor; and (e) determining the kinetic friction force between the discs and the heads from the moment of inertia of the discs and disc drive motor rotor about the axes of the discs and the angular accelerations of the disc drive case and of the discs relative to the disc drive case.

13. The method of claim 12, further characterized by:

(e) determining the maximum static friction force between the disc and the head from the moment of inertia of the disc and disc drive spindle motor rotor about the disc axis and the angular acceleration of the disc drive case at the onset of relative movement of the disc with respect to the disc drive case.

14. The method of claim 12 wherein step (b) is further characterized by:

(b)(1) repetitively measuring the angular velocity of the disc drive case; and (b)(2) determining a sequence of angular accelerations of the disc drive case from the measurements of the angular velocity of the disc drive case.

* * * * *